US012803750B2

(12) United States Patent
Li et al.

(10) Patent No.: US 12,803,750 B2
(45) Date of Patent: Nov. 17, 2026

(54) USER EQUIPMENT, SCHEDULING NODE, METHOD FOR USER EQUIPMENT, AND METHOD FOR SCHEDULING NODE

(71) Applicant: Panasonic Intellectual Property Corporation of America, Torrance, CA (US)

(72) Inventors: Hongchao Li, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 296 days.

(21) Appl. No.: 18/696,263

(22) PCT Filed: Jul. 5, 2022

(86) PCT No.: PCT/EP2022/068497
§ 371 (c)(1),
(2) Date: Mar. 27, 2024

(87) PCT Pub. No.: WO2023/051965
PCT Pub. Date: Apr. 6, 2023

(65) Prior Publication Data
US 2024/0380548 A1 Nov. 14, 2024

(30) Foreign Application Priority Data
Oct. 1, 2021 (EP) .................................... 21200570

(51) Int. Cl.
*H04L 5/00* (2006.01)

(52) U.S. Cl.
CPC .......... *H04L 5/0051* (2013.01); *H04L 5/0053* (2013.01)

(58) Field of Classification Search
CPC ............................ H04L 5/0051; H04L 5/0053
See application file for complete search history.

(56) References Cited

U.S. PATENT DOCUMENTS

2020/0137741 A1* 4/2020 Zhou .................. H04B 7/06968
2020/0229098 A1* 7/2020 Cheng ............... H04W 52/0248
(Continued)

FOREIGN PATENT DOCUMENTS

WO 2022077441 A1 4/2022

OTHER PUBLICATIONS

3GPP, "3rd Generation Partnership Project; Technical Specification Group Radio Access Network; NR; Multiplexing and channel coding (Release 15)," 3GPP TS 38.212 v15.6.0, Jun. 2019. (101 pages).
(Continued)

*Primary Examiner* — Ajay Cattungal
(74) *Attorney, Agent, or Firm* — Seed Intellectual Property Law Group LLP

(57) ABSTRACT

The disclosure relates to a communication device, a scheduling device, and respective methods for a communication device and a network node. More specifically, communication device comprises a transceiver, which in operation, receives a signalling. The communication device further comprises circuitry, which, in operation, (i) obtains from the signalling an availability indication, and (ii) determines, out of a plurality of configured reference signals (RSs), one or more RSs, for which the availability indication indicates an availability state. The circuitry determines the one or more RSs based on at least one of (i) a number of the plurality of configured RSs, (ii) a subset configuration received via radio resource control, RRC, or from a system information Block (SIB), (iii) a quasi co-location (QCL) reference of the signalling, and (iv) a timing occasion where the signalling is transmitted.

10 Claims, 5 Drawing Sheets

(56) References Cited

U.S. PATENT DOCUMENTS

| | | | | |
|---|---|---|---|---|
| 2021/0288773 | A1* | 9/2021 | Lin | H04L 5/0048 |
| 2021/0360586 | A1* | 11/2021 | Nam | H04L 1/0067 |
| 2021/0360680 | A1* | 11/2021 | Nam | H04W 68/025 |
| 2023/0051117 | A1* | 2/2023 | Tsai | H04L 5/0048 |
| 2023/0080106 | A1* | 3/2023 | Ji | H04L 1/0013<br>370/330 |
| 2023/0164607 | A1* | 5/2023 | Koskela | H04W 24/10<br>370/328 |
| 2023/0239099 | A1* | 7/2023 | Lin | H04W 72/23<br>370/335 |
| 2024/0007248 | A1* | 1/2024 | Liu | H04L 5/0051 |

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 v15.6.0, Jun. 2019. (99 pages).

3GPP, "3rd Generation Partnership Project; Technical Specification Group Radio Access Network; NR; Physical channels and modulation (Release 15)," 3GPP TS 38.211 v15.7.0, Sep. 2019. (97 pages).

3GPP, "3rd Generation Partnership Project; Technical Specification Group Radio Access Network; NR; Physical channels and modulation (Release 16)," 3GPP TS 38.211 v16.2.0, Jun. 2020. (131 pages).

3GPP, "3rd Generation Partnership Project; Technical Specification Group Radio Access Network; NR; Physical layer procedures for data (Release 16)," 3GPP TS 38.214 v16.7.0, Sep. 2021. (172 pages).

3GPP, "3rd Generation Partnership Project; Technical Specification Group Radio Access Network; Study on Scenarios and Requirements for Next Generation Access Technologies; (Release 15)," 3GPP TR 38.913 v15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).

Extended European Search Report, mailed Mar. 25, 2022, for European Patent Application No. 21200570.6. (12 pages).

International Search Report, mailed Jan. 3, 2023, for International Application No. PCT/EP2022/068497. (3 pages).

International Telecommunication Union (ITU), "IMT Vision—Framework and overall objectives of the future development of IMT for 2020 and beyond," Radiocommunication Sector of the ITU (ITU-R), M.2083-0, Geneva, Sep. 2015. (21 pages).

Lenovo, Motorola Mobility, "Provision of TRS/CSI-RS for idle/inactive UEs," R1-2107183, Agenda item: 8.7.1.2, 3GPP TSG RAN WG1 Meeting #106, e-Meeting, Aug. 16-27, 2021. (5 pages).

Nokia, Nokia Shanghai Bell, "On RS information to Idle/Inactive mode UEs," R1-2108123, Agenda item: 8.7.1.2, 3GPP TSG RAN WG1 #106-e, e-Meeting, Aug. 18-27, 2021. (14 pages).

Vivo, "TRS/CSI-RS occasion(s) for idle/inactive UEs," R1-2106607, Agenda item: 8.7.1.2, 3GPP TSG RAN WG1 #106-e, e-Meeting, Aug. 16-27, 2021. (5 pages).

* cited by examiner

USER EQUIPMENT, SCHEDULING NODE, METHOD FOR USER EQUIPMENT, AND METHOD FOR SCHEDULING NODE

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitating efficient operation of the communication system as well as particular devices pertaining to the system.

SUMMARY

One non-limiting and exemplary embodiment facilitates efficient signalling of the availability state of one or more reference signals (RSs).

In an embodiment, the techniques disclosed here feature an apparatus (e.g. a user equipment, UE). The apparatus comprises a transceiver that, in operation, receives a signalling. The apparatus further comprises circuitry which, in operation, (i) obtains from the signalling an availability indication, and (ii) determines, out of a plurality of configured reference signals (RSs) one or more RSs, for which the availability indication indicates an availability state. The circuitry determines the one or more RSs based on at least one of (i) a number of the plurality of configured RSs, (ii) a subset configuration received via radio resource control (RRC) or from a system information Block (SIB), (iii) a quasi co-location (QCL) reference of the signalling, and (iv) a timing occasion where the signalling is transmitted.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

DETAILED DESCRIPTION

5G NR system architecture and protocol stacks 3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
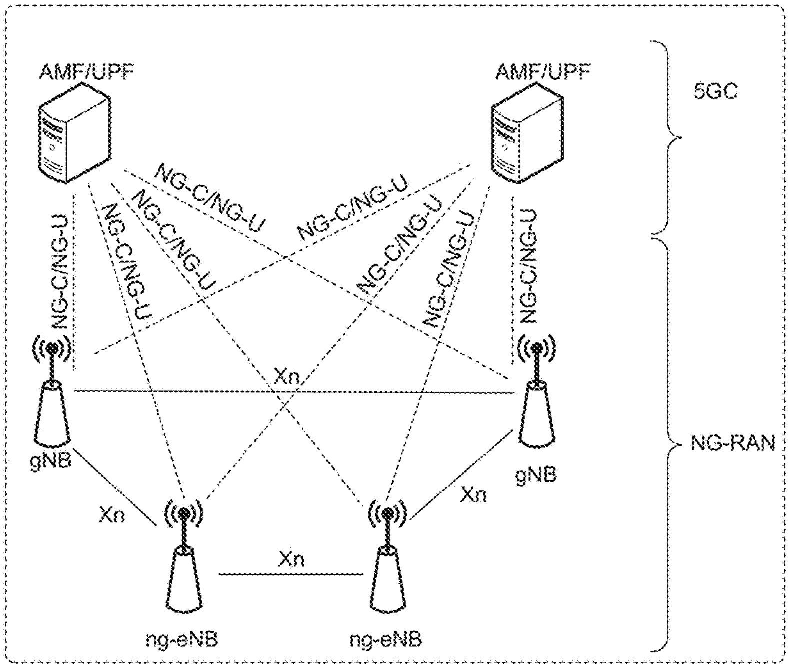
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v 15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^5$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v 16.2.0, e.g. section 4). For instance, downlink and uplink transmissions are organized into frames with 10 ms duration, each frame consisting of ten subframes of respectively 1 ms duration. In 5 g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

Comparing to LTE numerology (subcarrier spacing and symbol length), NR supports multiple different types of subcarrier spacing, labeled by a parameter μ (in LTE there is only a 15 kHz subcarrier spacing, corresponding to μ=0 in NR). The types NR numerology is summarized in 3GPP TS 38.211, v 15.7.0.

5G NR Functional Split Between NG-RAN and 5GC

Figure 2:
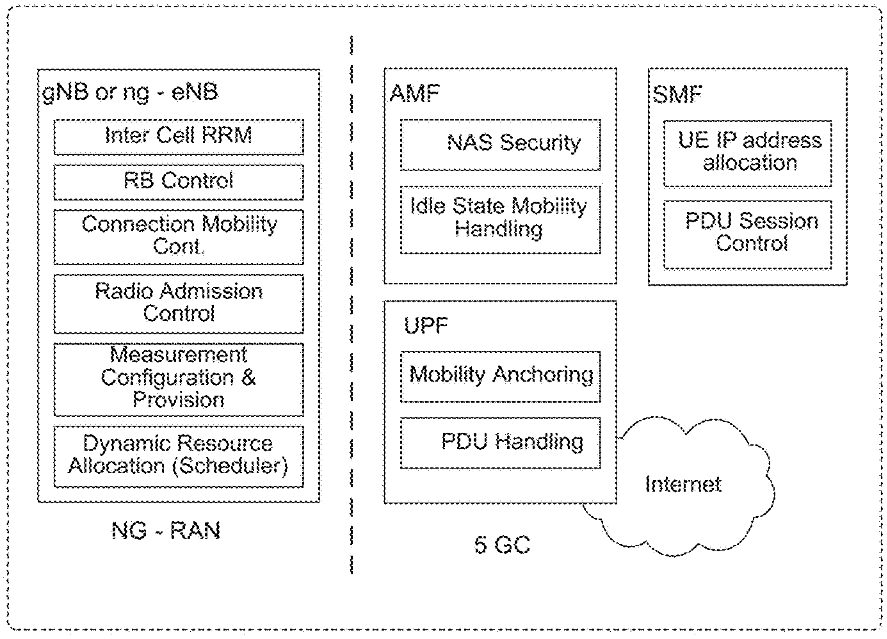
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signalling termination;
- NAS signalling security;
- Access Stratum, AS, Security control;
- Inter Core Network, CN, node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS;

Downlink Data Notification.

RRC Connection Setup and Reconfiguration Procedures

Figure 3:
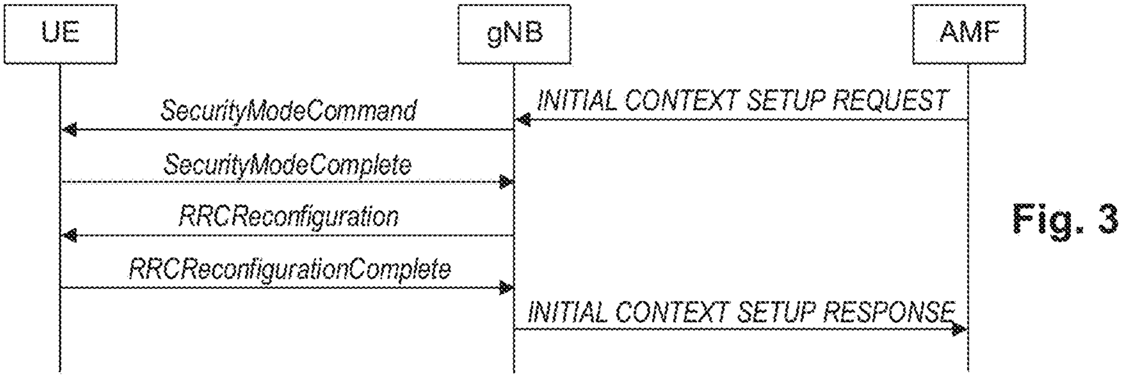
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v 15.6.0).

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

The operation of the RRC is guided by a state machine which defines certain specific states that a UE may be present in. The different RRC states in this state machine have different amounts of radio resources associated with them and these are the resources that the UE may use when it is present in a given specific state. Apart from RRC connected and RRC IDLE state, 5G NR has introduced a new RRC state names as RRC Inactive state. When UE is power up it is in Disconnected mode/Idle mode, It can move to RRC connected with initial attach or with connection establishment. If there is no activity from UE for a short time, It can suspend its session by moving to RRC Inactive and can resume its session moving to RRC connected mode. A UE can move to RRC Idle mode from RRC connected or RRC Inactive state. In connected state, the UE has both a signaling (control plane) and data (user plane) connection to the network. On the other hand, there is no data connection in the idle state and inactive state. Thus, in the idle and inactive states, the UE receives system information, synchronization, and paging. If a UE wants to send data, it has to use RACH procedure.

Usage Scenarios of IMT for 2020 and Beyond

Figure 4:
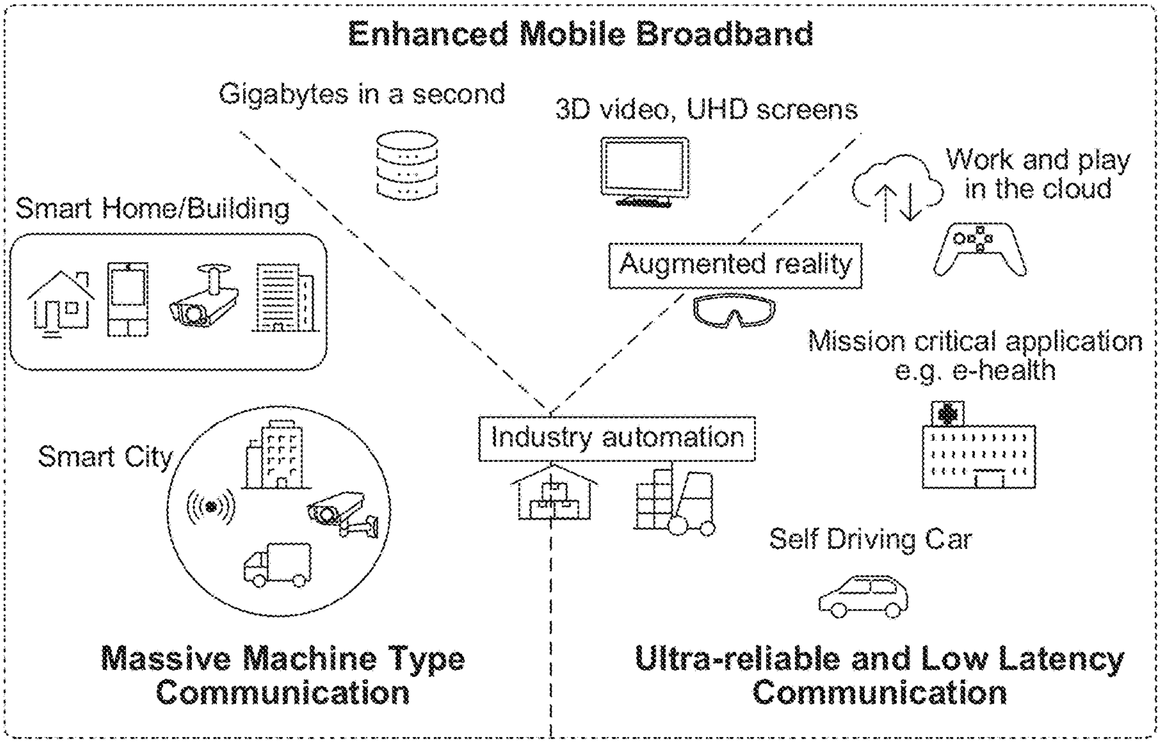
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
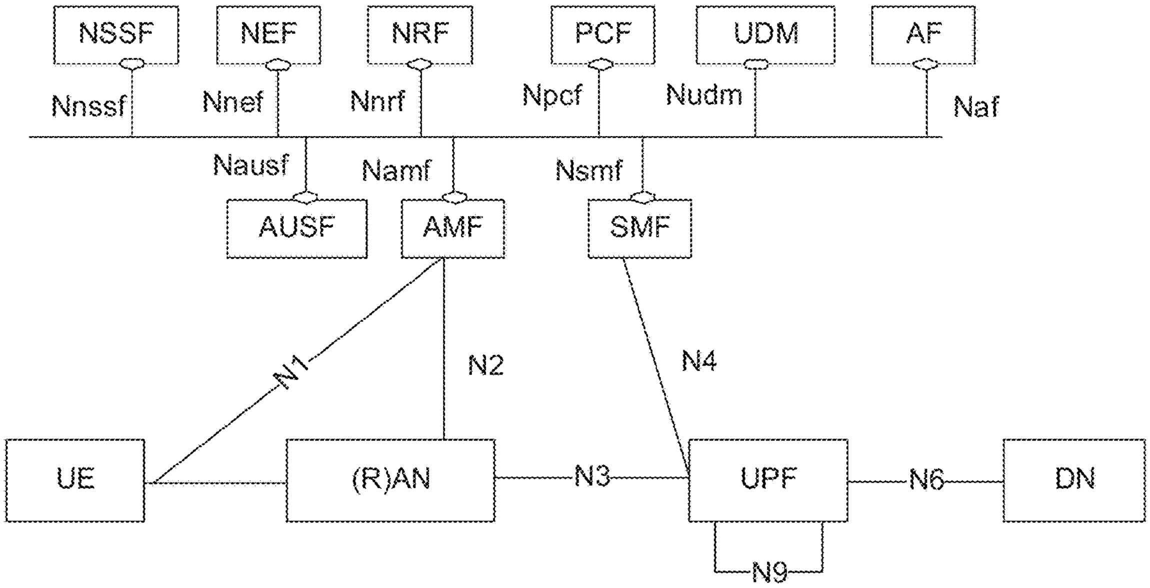
FIG. 5 is a block diagram showing an exemplary 5G system architecture for a non-roaming.

FIG. 5 illustrates a 5G NR non-roaming reference architecture (see TS 23.501 v 16.1.0, section 4.23). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc) of the 5GC to establish a PDU session including a radio bearer between a gNodeB and a UE in accordance with the QoS requirement and control circuitry, which, in operation, performs the services using the established PDU session.

Control Signals

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

Terminal

A terminal or user terminal or user device or mobile station or mobile node is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay. For instance, a terminal is a physical entity (physical node) within a communication network. Still further, the communication device may be any machine-type communication device, such as IoT device or the like. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Base Station

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well. A base station may be a scheduling node or network node, e.g. forming a part of the network for providing services to terminals. In particular, a base station may provide wireless access to terminals. Communication between the terminal and the base station is typically standardized and may be defined by different layers, such as PHY, MAC, RRC etc. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB. The term base station or radio base station here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Uplink/Downlink/Sidelink

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

Data Channels/Control Channels

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

Reference Signals

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

Synchronization and Synchronization Signal Blocks (SSBs)

In NR downlink synchronization, a UE detects the radio boundary (i.e., the timing when a radio frame starts) and OFDM symbol boundary (i.e., the timing when an OFDM symbol starts). This is performed by detecting and analyzing Synchronization Signal Blocks (SSBs). The components of an SSB include synchronization signal, namely a Primary Synchronization Signal (PSS) and a Secondary Synchronization Signal (SSS). Moreover, an SSB includes the PBCH which further includes PBCH DMRS and PBCH (Data). The SSB carries also further data. The NR SSB is transmitted in various different patterns, depending on numerology and some other parameters. The pattern is signaled within system information.

In NR, the TRS may be provided as a dedicated RS to a UE or as a common RS for a plurality of UEs in connected mode. Based on the TRS, the UE(s) may be able to perform a finer adjustments of the synchronization, without necessity to always receive the synchronization signal.

In some systems such as NR (e.g. Rel. 15/16), a TRS/CSI resource is configured for a UE to be utilized in measurements, e.g. for channel state estimation, time tracking, frequency tracking, and/or beam tracking, by the UE in RRC_CONNECTED mode. For UEs in other modes, RRC_IDLE and RRC_INACTIVE, such measurements may rely on the SSB. For Rel.17 NR, TRS/CSI-RS may also be used by some INACTIVE/IDLE UEs for time and frequency tracking, who supports this feature of additional TRS/CSI-RS occasions informed to these UEs. Thus, in general, TRS/CSI and SSB are signals that may be used by a UE, in any RRC state, for channel state estimation, time tracking (e.g. time synchronization), frequency tracking, and/or beam tracking.

In general, an SSB may be transmitted in a particular (spatial) direction, in which case the SSB may also be referred to as "SSB beam". In particular, each SSB/SSB beam may also have and/or indicate a beam index (also known as SSB index) that can be used to distinguish said SSB beam from other SSB beams, transmitted in other direction than said SSB beam. A UE may then determine, based on the received signal of the SSB beam, the SSB index of the received SSB beam and determine the direction in which it was transmitted by the base station.

In general, the current SSB structure and signaling in SIB1 may be used, by the gNB, to indicate to the UE the SSB beams that the gNB is using. The gNB may then inform, using an on/off indications (here also referred to as availability indication), the UE which beams shall be switched on or off during which period of time. For instance, a PDCCH in Common Search Space (CSS) may indicate the SSB beam's on-off state and the validity period of the indicated on/off-state. The PDCCH can be the PDCCH for Paging Early Indication (PEI), or paging PDCCH.

It is again noted that the SSB beam on-off indication may be transmitted to, received by, and used by RRC INACTIVE/IDLE and/or RRC CONNECTED UEs. Furthermore, it is noted that an SSB burst could comprise multiple transmitted SSBs, each of which is with a beam index and/or transmitted in a particular spatial direction. Each of these multiple SSBs of the SSB burst may then be an SSB beam. In other words, an SSB burst may comprise a plurality of SSB beams. The individual SSB beams of an SSB burst may for instance be transmitted by a scheduling device successively, at different times, during the transmission time (e.g. 5 ms) of the SSB burst. Since the present disclosure relates to the transmission of reference signals and the time of theirs presence/absence, both entities, a scheduled device (typically communication device/transceiver device) and scheduling device (typically network node) take part and, accordingly, the present disclosure provides a base station and a user equipment as well as corresponding methods as further described below.

Time Intervals

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

Frequency Bands

The present disclosure may be applied to any of a licensed band and an unlicensed band.

Communication

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

Antenna Ports

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Downlink Control Channel Monitoring, PDCCH, DCI

Many of the functions operated by the UE involve the monitoring of a downlink control channel (e.g. the PDCCH, see 3GPP TS 38.300 v 15.6.0, section 5.2.3) to receive e.g. particular control information or data destined to the UE.

A non-exhaustive list of these functions is given in the following:

- a paging message monitoring function,
- a system information acquisition function,
- signalling monitoring operation for a Discontinued Reception, DRX, function,
- inactivity monitoring operation for a Discontinued Reception, DRX, function,
- random access response reception for a random access function,
- reordering function of a Packet Data Convergence Protocol, PDCP, layer.

As mentioned above, the PDCCH monitoring is done by the UE so as to identify and receive information intended for the UE, such as the control information as well as the user traffic (e.g. the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that e.g. schedules a downlink data channel (e.g. the PDSCH) or an uplink data channel (e.g. PUSCH). In 5G NR there are a number of different DCI Formats defined already (see TS 38.212 v 15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g. limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Physical Resource Block

In general, the term "physical resource block" (PRB) refers to the smallest allocable resource unit usable for (user) data transmission. In LTE and NR, a PRB has a predetermined number (e.g. 12) of consecutive subcarriers in frequency domain and a predetermined number of symbols in time domain (e.g. 14 OFDM symbols in LTE).

Terminology

In the following, UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

Power Saving and Signalling Overhead

In the design of the NR, and especially in Rel. 17, efficient power saving has been one of aims. In particular, enhancements for idle or inactive-mode UE power saving, considering system performance aspects of physical layer (L1) and MAC layer are desirable. For example, paging enhancement (s) to reduce unnecessary UE paging receptions, subject to no impact to legacy UEs have been studied and discussed. Moreover, the possibility of providing potential TRS/CSI-RS occasion(s) which have been available in the connected mode to the idle/inactive-mode UEs, while minimizing system overhead impact has been discussed. An always-on TRS/CSI-RS transmission by a gNB should not be required. Similarly, further enhancements on power saving techniques for connected-mode UE, subject to minimized system performance impact are desirable. In particular, extension(s) to Rel-16 DCI-based power saving adaptation during DRX Active Time for an active BWP, including PDCCH monitoring reduction when C-DRX is configured have been studied. Moreover, the feasibility and performance impact of relaxing UE measurements for RLM and/or BFD, particularly for low mobility UE with short DRX periodicity/cycle have been studied.

Regarding the L1 TRS/CSI-RS availability indication, in the 3GPP RAN1 #106bis-e meeting, it was agreed to support at least one of the following alternatives:

- Alt1: L1 availability indication at an occasion provides availability/unavailability information only for RS resources with the same QCL reference as the L1 availability indication occasion.
- Alt2: L1 the availability indication at an occasion can provide availability/unavailability information for RS resources with QCL references not confined to be the same as for the L1 availability indication occasion.

According to Alt1, the RS resource availability and the L1 indication occasion with the same QCL reference are associated. However, if the L1 indication in occasion #n can only indicate the RS resource availability with QCL reference #n, there may be a delay for a UE to receive an availability indication for a particular RS resource. For instance, if the UE reselects a beam during the indication occasion, the UE may have to wait for the next paging cycle for receiving the corresponding availability indication. This may also result in an ambiguity between gNB and UE, if the UE reselects a new beam but does not know the corresponding RS resource availability. Furthermore, while there may be a low signaling overhead for each availability indication (each L1 indication itself only indicates the RS resource QCLed with the same reference), overall the signaling overhead may still be large, since the gNB may have to transmit an availability indication in every opportunity/paging cycle, to avoid or at least reduce the ambiguity.

If, on the other hand, each L1 indication occasion indicates the availability of each RS resource (possible implementation of Alt2), there may be a large overhead along with larger number of configured RS resources. For example, if 8 TRS resources with 8 QCL references are configured, there are 8 L1 indication occasions per paging cycle, in each of which availability of each of the 8 TRS resources is indicated.

Embodiments

In particular in view of the above-mentioned issues, the present disclosure provides techniques for efficient signalling of the availability state of one or more reference signals (RSs). In particular, regarding the additional RS occasions for IDLE/INACTIVE mode, UEs enhancements for idle/inactive-mode UE power saving are provided considering system performance aspects. Furthermore, the present disclosure may be applied for paging enhancement(s) to reduce unnecessary UE paging receptions, subject to no impact to legacy UEs [RAN2, RAN1, RAN3]. The present disclosure applies in particular the potential TRS/CSI-RS occasion(s) available in connected mode to idle/inactive-mode UEs, minimizing system overhead impact [RAN1], but also to UEs in connected mode. In general, always-on TRS/CSI-RS transmission by gNodeB may not be required.

Figure 6:
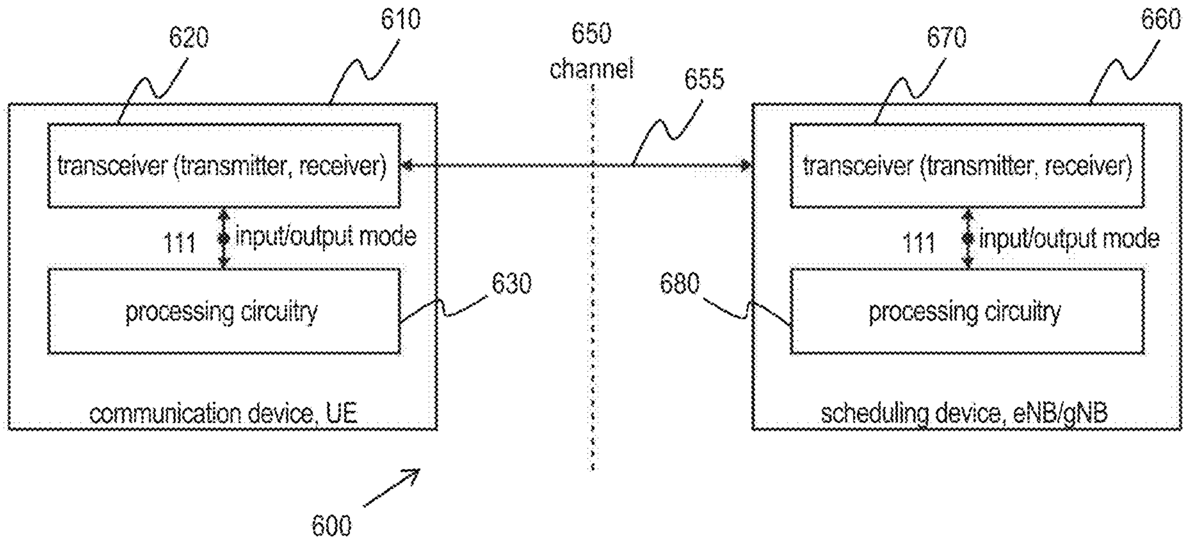
FIG. 6 is a block diagram of a communication system including a user equipment and a base station with their respective structure.

Accordingly, both entities, a RS signals receiving device (typically communication device/transceiver device, UE) and RS signal transmitting device (typically network node, scheduling device, base station) take part. Accordingly, the present disclosure provides a base station and a user equipment. As illustrated in FIG. 6, user equipment 610 and base station 660 may communicate with each other over a wireless channel in a wireless communication system. For instance, the user equipment may be a NR user equipment, and the base station may be a network node or scheduling node such as a NR gNB, in particular a gNB in a Non-Terrestrial Network (NTN) NR system.

The present disclosure further provides a system including a scheduled and scheduling device, as well as a corresponding methods and programs. An example of such communication system is illustrated in FIG. 6. The communication system 600 may be a wireless communication system in accordance with the technical specifications of 5G, in particular a NR communication system. However, the present disclosure is not limited to 3GPP NR and may also be applied to other wireless or cellular systems such as NTNs.

FIG. 6 illustrates a general, simplified and exemplary block diagram of a user equipment 610 (also termed communication device) and a scheduling device 660 which is here exemplarily assumed to be located in the base station (network node) e.g. the eNB or gNB. However, in general, a scheduling device may also be a terminal in case of a sidelink connection between two terminals. Moreover, in particular with respect to the use cases of URLLC; eMBB, and mMTC, the communication device 610 may also be a sensor device, a wearable device, or a connected vehicle, or a controller of an automated machine in an industrial factory. Further, a communication device 610 may be able to function as a relay between base station 660 and another communication device (e.g. the disclosure is not limited to communication "terminals" or user "terminals").

The UE and eNB/gNB are communicating with each other over a (wireless) physical channel 650 respectively using their transceivers 620 (UE side) and 670 (base station side). Together, the base station 660 and the terminal 610 form the communication system 600. The communication system 600 may further include other entities such as those shown in FIG. 1.

The communication device 610 may comprise the transceiver 620 and a (processing) circuitry 630, and the scheduling device 660 may comprise the transceiver 670 and a (processing) circuitry 680. The transceiver 610 in turn may comprise and/or function as a receiver and/or a transmitter. In this disclosure, in other words, the term "transceiver" is used for hardware and software components that allow the communication device 610, or, respectively base station 660 to transmit and/or receive radio signals over a wireless channel 650. Accordingly, a transceiver corresponds to a receiver, a transmitter, or a combination of receiver and transmitter. Typically, a base station and a communication device are assumed to be capable of transmitting as well as receiving radio signals. However, particularly with respect to some applications of eMBB, mMTC and URLLC (smart home, smart city, industry automation etc.), cases are conceivable in which a device, such as a sensor, only receives signals. Moreover, the term "circuitry" includes processing circuitry formed by one or more processors or processing units, etc.

As shown in FIG. 6, in some embodiments, the user equipment (UE) 610 comprises a transceiver 620 which, in operation, receives a signalling; and circuitry 630 which, in operation, (i) obtains from the signalling an availability indication, and (ii) determines, out of a plurality of configured RS, one or more RS, for which the availability indication indicates an availability state.

Figure 7A:
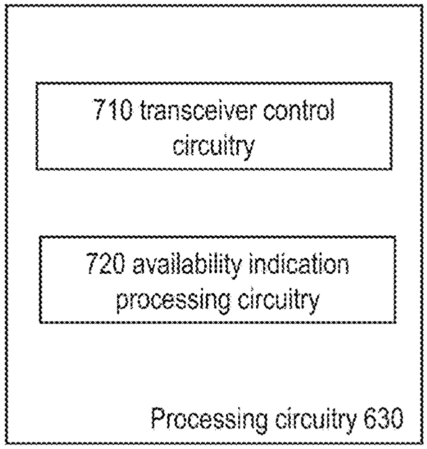
FIG. 7A is a block diagram illustrating functional structure of the processing circuitry at the user equipment side.

FIG. 7A shows a functional structure of the circuitry 630. In particular, it includes a transceiver control circuitry 710. The transceiver control circuitry 710, in operation, controls the transceiver. For example, the control of the transceiver 620 may include controlling the transceiver 620 to decode (monitor) the PEI and/or the POs and/or system information or the like; or to receive (detect) reference signal. In particular, the transceiver control circuitry 710 may control the transceiver 620 to decode the availability indication. The circuitry 630 may include availability indication processing circuitry 720, which determines the subset of RSs for which the availability indication received by the transceiver 620 indicates an availability state. Based on the availability indication, circuitry 720 may also determine the availability state indicated by the availability indication for the RSs of the determined subset.

As also shown in FIG. 6, in some embodiments, the base station 660 (or scheduling device 660) comprises a circuitry 680. The circuitry 680, in operation, determines that a signalling that includes an availability indication is to be generated. The circuitry 680, in operation, determines, out of a plurality of configured RSs, one or more RSs, for which the availability indication is to indicate an availability state. Furthermore, the circuitry 680, in operation, generates the signalling, and the transceiver 670, in operation, transmits the generated signalling.

Figure 7B:
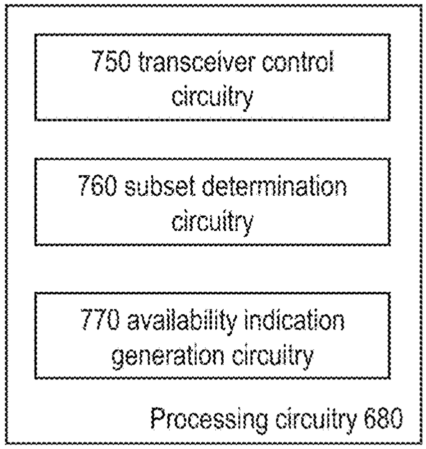
FIG. 7B is a block diagram illustrating functional structure of the processing circuitry at the base station side.

FIG. 7B shows a functional structure of the circuitry 680. In particular, circuitry 680 includes a transceiver control circuitry 750. The transceiver control circuitry 750, in operation, controls the transceiver. For example, the control may include controlling the transceiver 670 to transmit the PEI and/or the POs and/or system information or the like; and/or to transmit reference signal. In particular, the transceiver control circuitry 710 may control the transceiver 670 to transmit the availability indication. The circuitry 680 may include subset determination circuitry 760, which determines the RSs for which the availability indication is to indicate the availability state. Circuitry 760 may also determine whether the availability indications of the RS(s) should indicate availability or unavailability. Moreover, the circuitry 680 may include availability indication generation circuitry 770, which generates the availability indication and/or the signalling that includes the availability indication. The transceiver control circuitry 750 then controls the transceiver to transmit a signalling that indicates the starting time.

Figure 8:
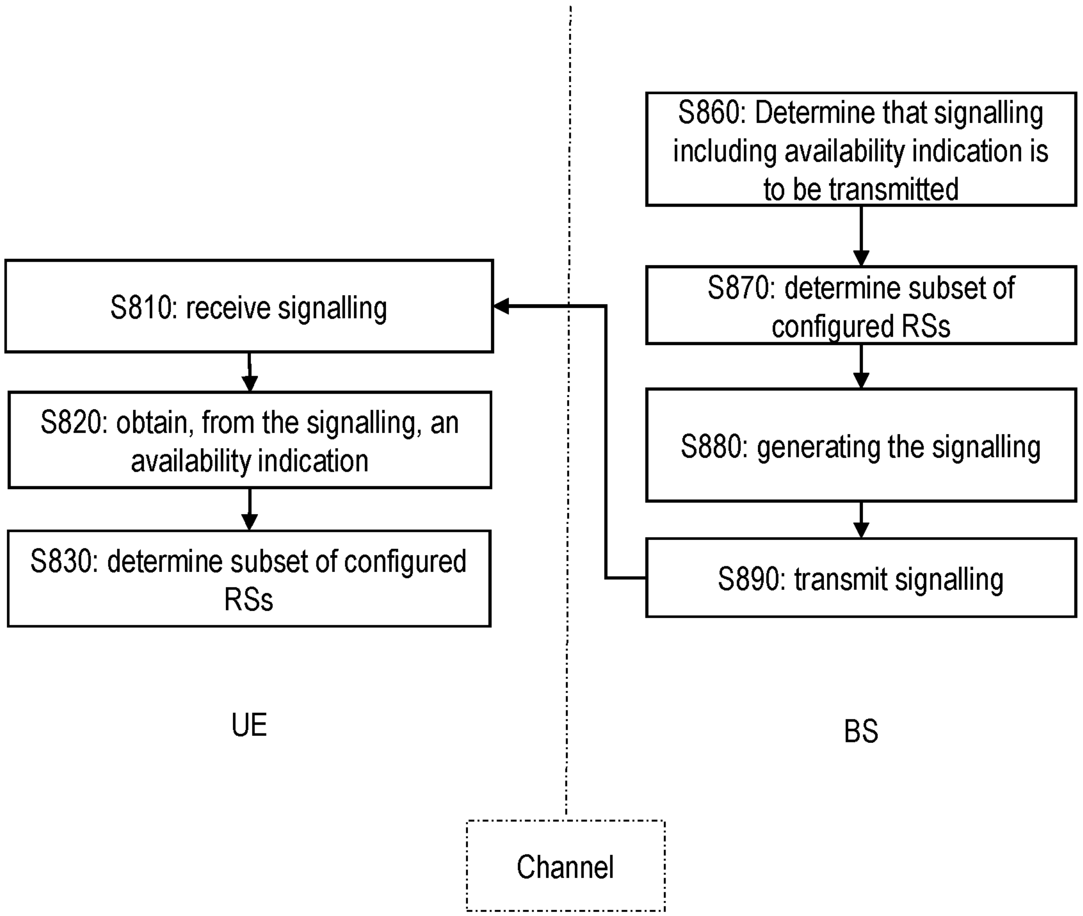
FIG. 8 is a flow chart illustrating exemplary steps performed by a network node as well as exemplary steps performed by a user equipment.

In correspondence with the above described UE, a communication method to be performed by a UE is provided. As shown in FIG. 8, the method comprises a step of (i) receiving S810 a signalling; (ii) obtaining S820, from the signalling, an availability indication; and (iii) determining S830, out of a plurality of configured RSs, one or more RSs, for which the availability indication indicates an availability state.

Furthermore, in correspondence with the above described base station, a communication method to be performed by a base station (or scheduling device) is provided. As shown in FIG. 8, the method comprises a step of (i) determining S860 that a signalling that includes an availability indication is to be generated; (ii) determining S870, out of a plurality of configured RSs, one or more RSs, for which the availability indication is to indicate an availability state; (iii) generating S880 the signalling; and (iv) transmitting S890 the signalling.

Circuitries

The circuitries 630, 680 (or processing circuitries) may be one or more pieces of hardware such as one or more processors or any LSIs. Between the transceiver and the processing circuitry there is an input/output point (or node) over which the processing circuitry, when in operation, can control the transceiver, i.e. control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data that is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto.

It is noted that the circuitries may be a general processing circuitry including one or more processors which may execute code instructions stored in a memory (which may be also part of the circuitry) and which may include portions of the code instructions corresponding to the functionality described above with reference to respective circuitry 710-730 and 750 to 770. The functionality may be provided by hardware adaption and/or by software. The present disclosure is not limited to any particular circuitry and embodiments of the disclosure may include dedicated or programmable hardware or general purpose hardware or any combination thereof.

It is further noted that any of the steps/operations described below may be performed or controlled by the circuitry 630 (on the UE side) and/or the circuitry 680 (on the base station side). In particular, in the further description, the details and embodiments apply to each of the transceiver device, the scheduling device (or scheduling nodes) and the methods unless explicit statement or context indicates otherwise. In particular, it is noted that, since a UE and a network node from a communication system in which the UE uses the RS(s), the UE and the network node will have to know/determine the same RSs for which the availability indication indicates the availability state. Thus, in general, the UE and network node may individually determine the expected UE behavior using the same methods or using methods that at least yield the same result. In other words, the determination methods of the subset of RSs for which the availability indication indicates the availability state according to the present disclosure may in general be performed at the side of the UE and/or base station (network node).

L1 Indication

In general the signalling including the availability indication and e.g. transmitted in step S890 and received in step S810 may be a L1 Indication or physical layer indication (it is noted that L1 refers to layer 1). Accordingly, the signaling may be a L1 signaling, e.g. a PEI (paging early indication) or a paging DCI or the like, as a contrast to e.g. RRC signaling which is sometimes also referred to as higher-layer signaling.

The (monitoring) opportunity (in the present disclosure, also referred to as an (monitoring) occasion) for an IDLE and/or INACTIVE UE to monitor the L1 signaling is usually once per paging cycle, which can be for instance 320 ms, 640 ms, 1.28 s or 2.56 s. Without a clear definition on how and when a UE assumes the availability/unavailability of RS after reception of the indication, some ambiguity may occur in the behavior between the gNB and the UE. For instance, if a UE starts to assume the RS is present, before the RS is transmitted, or if a UE still assumes that the RS is present, after the RS is stopped being transmitted. Such ambiguity is due to the gNB which may decide when to indicate availability of the RS. It is noted that even though RSs are present in the configured resources, and, for instance provided to the CONNECTED state UEs, the gNB does not have to signal that these RSs are available also for the IDLE/INACTIVE UE's. However, the availability indication, transmitted in these monitoring occasion, may in general also be received and used by connected UEs in order to determined availability state of RSs.

It is noted that the opportunities occasions mentioned above may in particular be signal/channel monitoring occasions, such as paging PDCCH or a PEI monitoring occasions to provide the L1 availability indication.

Availability Indication

In general, the signalling including the availability indication or availability signalling may be a L1 signalling. In particular, as mentioned above, the availability signalling may include or be a PEI or a paging DCI. The availability signalling includes an availability indication, which is generated by the scheduling device and may be received/obtained by the UE. The availability indication may indicate a present and/or future state of one or more reference signals (RSs). If there are more than RS, the availability indication may indicate a state for each of said RSs or one state for all or a group of RSs. In particular, an availability indication may indicate different states for the RSs. However the availability indication may also indicate a common or the same availability state for multiple or even all of the indicated RSs. The determination of the RSs for which an availability indication indicates an availability state is further explained below.

In general, there may be two availability states of an RS, which are here denoted as "available" and "unavailable". Here, "available" may mean that the RS is transmitted (e.g. periodically) by the base station and that the UE is expected use the RS, whereas "unavailable" may mean that the UE is not expected to use the RS. Here it should be noted that, when the UE is expected to use the RS, the RS is/should in general also be transmitted by the base station; and when the base station is not transmitting the RS, the UE is/should in general also be expected to not use the RS. However, when the base station is transmitting the RS, the UE may or may not be expected to use the RS; and when the RS is expected to not use the RS, the base station may actually be transmitting the RS. Furthermore, it should be noted that the availability state indicated by the availability indication can, but must not, correspond to the current availability state of the RS or the currently expected behavior of the UE. For instance, the indicated availability state may in general indicate an availability state of the RS that applies from a starting time, which may in general be after the reception time of the availability indication.

In general, the availability indication/L1 indication can be bitmap or codepoint. For instance, the availability indication may indicate the availability state of the RSs:

- using a bitmap, where each bit is associated with at least one resource or resource configuration or a set (group) of resources;
- using a codepoint, which indicates a state of availability/unavailability for all or some of configured reference signal resources; and/or
- using a value or codepoint to indicate one or more resources or resource configuration indices that correspond to available RS resources.

However, the present disclosure is not limited to any particular way of indicating the availability state of the RSs by the availability indication.

Furthermore, it is noted that a RS is in general associated with particular (e.g. periodic) resources, in which said RS is transmitted. In particular, such an RS resource may be a RS from configured TRS/CSI-RS occasion(s) for idle/inactive UEs, where the configuration for TRS/CSI-RS occasion(s) for idle/inactive UEs is based on periodic TRS only. Accordingly, the availability indication also indicates the availability state of the corresponding RS resource(s). In other words, in the context of the availability indication, the terms "reference signal (RS)" and "RS resource" may used interchangeably unless context indicates otherwise.

Furthermore, it is noted that the terms RS and RS configuration are used here interchangeably. That is, an RS (configuration) may correspond to a plurality of RS occasions, where the term RS occasion refers to individual transmissions of the reference signal. In other words, an RS occasion may correspond to specific time/frequency resource(s) in which a transmission of the RS takes place (e.g. takes place according to a specific pattern defined by the RS configuration). Here, it should be noted that the different or the same signals may be transmitted at the individual RS occasion of a given RS.

Finally it is noted that, in general, the RS(s) of which the availability indication indicates availability or unavailability may be traffic TRS(s) (e.g. CSI-RS for tracking), which may also be used as a CSI-RS, and/or SSBs. In particular, the availability of the TRS/CSI-RS may already signaled to UEs in the connected state. In principle, availability of any kind of reference signal may be signaled. When the reference signal is transmitted and available to connected state UEs, it may be beneficial to provide the reference signal also for the idle and/or inactive state (state may be also referred to as mode in this disclosure).

As mentioned above, TRS (are similar to CSI-RS, but serve the purpose of tracking synchronization) have been originally configured and transmitted only for the CONNECTED state UEs. Thus, the IDLE or inactive state UEs have had no possibility of tracking the synchronization apart from the synchronization procedure based on the reception of the PSS and SSS. However, it may be advantageous to provide also the IDLE and inactive mode UEs with such reference signals, especially when the overhead can be kept reasonable. Accordingly, based on the TRS transmission status on whether it is stably present, the gNB may send the TRS availability indication to IDLE/INACTIVE UEs, who can also share the TRS used for the time/frequency tracking and serving cell measurement.

Thus, the RSs (or, as a particular example TRS) which are configured for the CONNECTED state UE's may be also used by the IDLE or inactive state UEs. When referring to "stable present" above, what is meant is that there are RSs with the same configuration present over certain time, so that even IDLE/inactive UEs may have chance to make use of them.

If there is switching from available to unavailable, it may be better to indicate such switching in advance, before gNB stops transmitting the RS. Otherwise, if gNB firstly stops transmitting the RS and then indicates the unavailability, this may cause UE ambiguity when using the RS e.g. for serving cell measurement, and issues may arise, if the UE tries to use signal detected at a position in which no longer any RS is transmitted. It may be desirable to define the UE behavior with as little overhead as possible and to avoid ambiguity and/or misalignment between the gNB and UE. The BS may take the expected behavior of the UE into account when planning the RS transmission and the corresponding availability indications. For a L1 signaling, the starting time for the availability indication to take effect may be defined by a fixed time duration, e.g. the K0 value contained in the DCI or a N0 value defined by UE capability.

For CONNECTED mode UEs, the activation and deactivation of semi-persistent CSI-RS is usually performed by a MAC CE (control element) and the application delay for both is 3 ms, which is defined by $$n+3N_{slot}^{subframe,\mu}$$

As the indication may involve multiple RS configurations and the opportunity for an IDLE/INACTIVE UE to monitor the L1 signaling is once per paging cycle, which can be 320 ms, 640 ms, 1.28 s or 2.56 s, to apply the indication timely as ordinary L1/L2 (MAC) signaling is not practical. The indication should be ahead of switching from available to unavailable, to avoid the issues shown in FIG. 10. For earlier and efficient RS usage, the indication of switching from unavailable to available can be before or after the actual RS presence, based on gNB scheduling preference. According to some embodiments presented below, for availability and unavailability indication for a certain RS configuration, UE decides the start and end timing to take effect, based on whether the indication indicates "available" or the indication indicates "unavailable".

Quasi Co-Location (QCL)

According to the definition of QCL in TS38.214 Sec 5.1.5, the UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the present disclosure, when a RS (or, as mentioned above a RS resource) is QCLed with an SSB index, said SSB index is also referred to as the QCL reference of said RS (resource). Likewise, when a RS is QCLed with an SSB beam, said SSB beam may also be referred to as the QCL reference of said RS. In general, one, multiple, or each RS of the configured RSs may be QCLed with a respective SSB.

Figure 9:
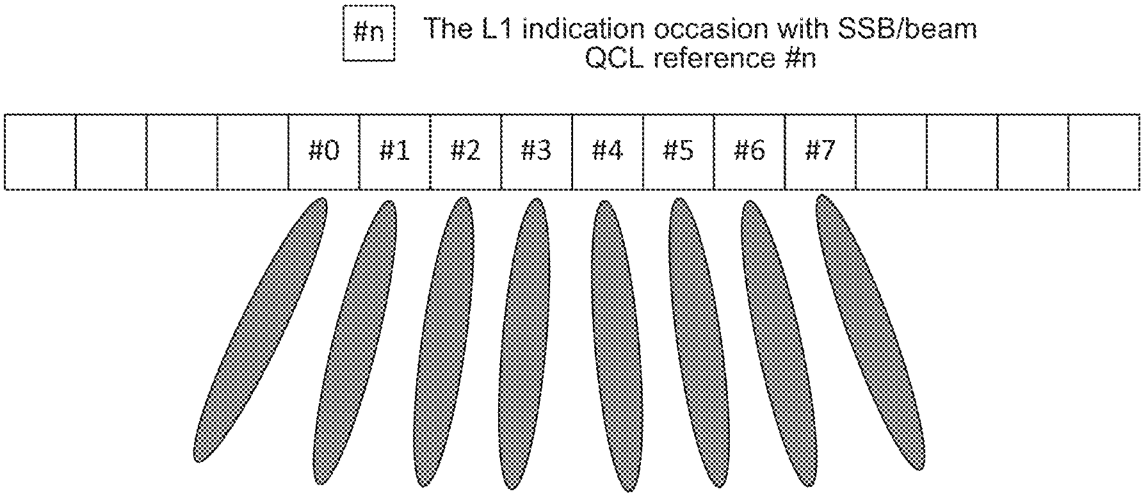
FIG. 9 is a schematic drawing illustrating transmission of multiple L1 indications with respective QCL references.

In particular, the QCL reference of the signalling including the availability indication may be the SSB index of the SSB with which the signalling is QCLed. For instance, as illustrated in FIG. 9, there may be 8 SSBs/beams with respective indices #0 to #7. Each of the SSBs/beams may include an availability signalling (e.g. a L1 indication). Said signalling, accordingly, have QLC references #0 to #7, respectively.

It is further noted that the index of the SSB or SSB index can e.g. be (i) SSB index expressed by the absolute number (e.g. the absolute and continuous number counting of the SSB indices starting from 0 with the first index); (ii) SSB index of the actually transmitted beam, which is indicated by ssb-PositionsInBurst in SIB1; (iii) SSB index of the QCL indicated (e.g. indicated by SIB or RRC); (iv) an index of the beam transmitting/carrying the SSB (i.e. a beam index).

Selective RS Resource Availability Indication

In general, in each L1 availability indication occasion, the availability/unavailability of a subset of the configured RS resources is indicated. It is noted that the subset may include all of the configured RSs. Furthermore, it is noted that, in the present disclosure, this subset is also referred to as the one or more RSs. In general, the one or more RSs (i.e. the subset) may be determined (e.g. by circuitry 630, 720, 680, 760) based on at least one of (a) the number of the plurality of configured RSs, (b) a subset configuration received via RRC or from a SIB, (c) the QCL reference of the signalling, and (d) the timing occasion where the signalling is transmitted. In general, more than one or even all of the above criteria (a) to (d) may be used for determining the one or more RS. In other words, how to decide the subset is based on one or multiple of the above principles, explained in more detail below.

(a) Based on the Number of Configured RSs

In general, whether or not the availability of all configured RSs is indicated may be determined based on a comparison of a threshold (value) with the number of configured RSs. In this way, the L1 control signaling overhead may be reduced while keeping the flexibility of signaling.

Figure 10:
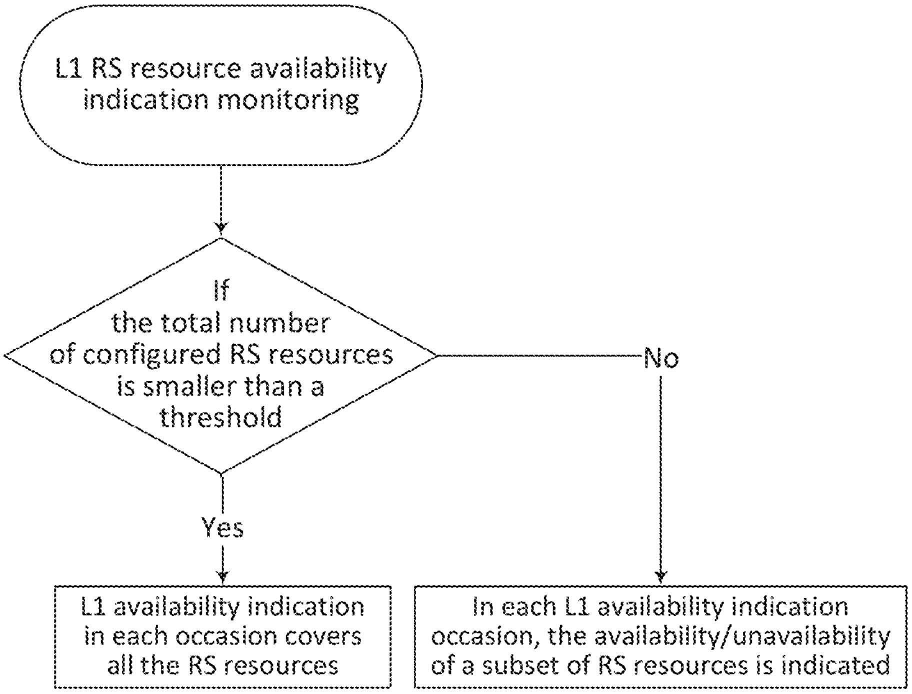
FIG. 10 is a flow chart illustrating exemplary steps performed by a UE.

For instance, as illustrated in FIG. 10, when the number of the configured RSs is smaller than or equal to a threshold value, the availability indication may indicate, for each of the configured RSs, an availability state of the RS. If, on the other hand, the number of configured RSs is larger than the threshold value, the availability indication may indicate, for a number of the one or more RSs that is smaller than the number of the configured RSs, an availability state of the RS.

Here, the term "number of configured RSs" refers to the "total" number or count of configured RSs.

More specifically, when the number of the configured RSs is smaller than the threshold value, the subset of RSs may include all configured RSs. In other words, availability of all the RS resources is reported. For instance, in each occasion, the L1 availability indication may cover (indicate availability of) all the RS resources.

If, on the other hand, the number of configured RSs is larger than the threshold value, the subset may not include all configured RSs. In other words, if the total number of configured RS resources is larger than a threshold, a "true" subset is reported. For instance, in each L1 availability indication occasion, the availability/unavailability of less than the configured RSs resources is indicated. In other words, the number of the RSs in the subset is smaller than the number of configured RSs. This subset may be determined for instance in accordance with one or multiple of the other criteria (b) to (d).

It is noted that the threshold value may also be chosen (e.g. redefined/decreased by one) such that, if the number of the configured RSs is equal to the threshold value, all configured RSs are included in the subset. In general, the threshold or threshold value can e.g. be fixed, predefined, or configured by SIB.

(b) Based on a Subset Configuration

In general, the subset of RSs may be determined based on a subset configuration. In particular, the subset may be decided and/or determined by the subset configuration.

A subset configuration may for instance include an indication indicating the number of the one or more RSs. Here, the term "number of the one or more RSs" refers to total number or count of the RSs for which the availability state is indicated by the signalling. If only the number of RSs is indicated by the configuration one of the criteria (c) and (d) may be used to completely determined the subset indicated by the signalling.

A subset configuration may also indicate the one or more RSs. In other words, a subset configuration may specify a subset, i.e., a subset configuration may indicate, for each of the configured RSs, whether or not an availability indication indicates an availability state of the RS.

In general, there may be a different subset configurations for different QCL references of the signalling. That is, a plurality of subset configurations may be defined and/or configured. For instance, there may be a plurality of subset configurations associated with (or "for") a plurality of QCL references, respectively. The plurality of QCL references may include the QCL reference of the signalling including the availability indication as well as the QCL references of other monitoring occasions. Each subset configurations may indicate or specifies a subset of the configured RSs. It is noted, that some QCL reference may use the same subset configuration. In other words, each subset configuration may be associated with one or more QCL references. The subset configuration relevant for determining the subset of a given availability signalling may then depend on the QCL reference of said signalling. That is, the one or more RSs may be the RSs of that subset that is indicated by the subset configuration for (i.e., associated with) the QCL reference of the signalling. In other words, a subset configuration may apply to availability signalling(s) with specific QCL reference(s).

Accordingly, the UE (e.g. the transceiver 620, in operation), may receive a plurality of subset configurations for a plurality of QCL references, respectively. For example, the UE may receive a plurality of indications of a respective plurality of subsets. In accordance therewith, the base station may transmit such a plurality of subset configurations and/or indicate a plurality of subset configuration. Such a subset configuration may in general be received/transmitted via RRC or be obtained from a SIB.

Summarizing, for L1 RS availability indication, the subset of all the configured RS may be decided by a RRC or SIB configuration. For each L1 indication with different QCL reference and/or for each monitoring occasion with different QCL reference, the bitmapping/codepoint rule of the availability indication and/or bit width of the availability indication may be RRC/SIB configured. E.g., for each QCL reference #n, the bitmapping/codepoint rule and/or bit width can be configurable.

Using subset configuration(s), in particular different subset configurations for different QCL reference of the L1 signalling, may achieve a good compromise between overhead and flexibility and also allows to take UE IDLE/INACTIVE mode mobility into account.

(c) Based on QCL Reference of the Signalling

In general, the one or more RSs may be determined based on: (i) the SSB index QCLed with the signalling, and (ii) SSB indices with which the configured RSs are QCLed.

For instance, if the number m of the one or more RSs is known (e.g. configured by RRC/SIB), the subset may include (or consist of) those m configured RSs for which an absolute value of a difference between (i) the SSB index of the SSB QCLed with said RS, and (ii) the index of the signalling, is the smallest among the configured RSs.

In other words, the RSs of the subset are those configured RSs with the smallest index differences among the configured RSs, where the index difference of a RS is the absolute value of the difference between (i) the SSB index of the QCL reference of the RS and (ii) the SSB index of the signalling including the availability indication.

In particular, the subset may be decided by the QCL reference of the beam index of the L1 indication monitoring occasion and the bit width of the availability indication. It should be noted that the number of RSs in the subset may correspond to the bit width of the availability indication. The bit width can be predefined or SIB configured, which can be same or different between L1 indication monitoring occasions with different QCL references, e.g. as explained in (b) above.

In other words, the subset of the RS resources is decided by the L1 indication occasion and the adjacent QCL references. More specifically, as an example, it is assumed that 8 SSB/beams are transmitted. Furthermore, 8 TRS resources are assumed to be configured by SIB and QCLed with 8 SSB/beams with indices #0 to #7, respectively. Assume further that the L1 indication bit width is 3 (in general, the bit width can be less or more than 3). Then, if the received L1 indication occasion has QCL reference #0, the availability indication "101" may stand for TRS QCLed with SSB #0 and #2 are available, and TRS QCLed with SSB #1 is unavailable. If, on the other hand, the received L1 indication occasion has QCL reference #4, the L1 signaling of 3 bits "101" corresponds to the TRS QCLed with SSB #3, #4 and #5, i.e. "101" indicates that RS QCLed with SSB #3 and #5 are available, and TRS QCLed with SSB #4 is unavailable.

In other words, the subset of the RS resources may be decided by the L1 indication occasion and the nearest distance from the RS QCL reference index.

It is noted that, in general, the number of configured RSs may be smaller than (i) the total number (e.g. count) of SSB indices, or (ii) the number of beams. Here, the "total number of SSB indices" refers e.g. to the number of SSBs with different indices that is periodically transmitted by the base station. The total number may also be the number of the SSB indices/beams that the gNB actually transmits in a SSB burst. E.g. the gNB may usually transmit from 8 to 64 SSBs within a SSB burst.

For example, it is assumed that 8 SSB/beams are transmitted and 5 TRS resources are configured by SIB and QCLed with SSB #0, #1, #4, #6, #7, respectively. Again, the bit width of the L1 indication bit exemplarily assumed to be 3 (in general, the bit width can be less or more than 3). Then, in the L1 indication occasion with QCL reference #3, the 3 bits correspond to the TRS QCLed with SSB #0, #1, and #4. I.e. "001" may indicate that TRS QCLed with SSB #0 and #1 are unavailable, and TRS QCLed with SSB #4 is available. If, on the other hand, the L1 indication occasion is QCLed with SSB #5, the 3 bits correspond to TRS QCLed with SSB #4, #6 and #7, as they are closest ones with #5. I.e. "001" may indicate that TRS QCLed with SSB #4 and #6 are unavailable, and TRS QCLed with SSB #7 is available.

When certain indices have the same distance to the L1 indication QCL reference, some rule may apply like lower/higher index has higher priority.

Using the adjacency/difference between the QCL reference of the signalling and the RS may achieve some compromise between overhead and flexibility while also taking into account UE IDLE/INACTIVE mode mobility account.

Deciding the subset of RSs based on the QCL reference of the signalling may achieve some compromise between overhead and flexibility while also taking into account UE IDLE/INACTIVE mode mobility.

(d) Based on a Timing Occasion where the Signalling is Transmitted

In general, the subset of RSs may be determined based on the timing occasion of the signalling including the availability indication. In particular, the timing occasion may be the time when the L1 signalling is transmitted. In general, this timing occasion (above, also referred to as monitoring occasion) may have a QCL reference.

Based on the QCL reference on the timing occasion, the subset of RSs may explained as already explained above under (c) for the QCL reference of the signalling. It is noted that the QCL reference of the timing occasion may usually be the same as the QCL reference of the signalling.

In general, the subset of the RSs for which the availability indication indicates an availability state may the configured RSs that are QCLed with particular SSBs (e.g. QCLed with particular SSB indices). In other words, the RSs of the subset may have particular index values as QCL references. For instance the subset of the RSs for which the availability indication indicates an availability state may be those of the configured RSs that are QCLed with an SSB with SSB index n, (n+1)mod X, (n+2)mod X, . . . , and (n+m−1)mod X.

More specifically, the subset includes the RSs that are QCLed with the SSB with SSB index n, the RSs that are QCLed with the SSB with SSB index (n+1)mod X, the RSs that are QCLed with the SSB with SSB index (n+2)mod X, . . . , and the RSs that are QCLed with the SSB with SSB index (n+m−1)mod X. Thus, the availability state of the RSs QCLed with SSB #n, the RSs QCLed with SSB #(n+1)mod X, . . . , and the RSs QCLed with (n+m−1)mod X is indicated and/or are included in the subset. It is noted that each RSs that is QCLed with at least one of the SSBs given by the formula(s) is included in the subset.

Alternatively, the one or more RSs may be those of the configured RSs that are QCLed with the SSBs with indices $$\left(n-\left\lfloor\frac{m}{2}\right\rfloor\right)\mathrm{mod}X,\ \left(n+1-\left\lfloor\frac{m}{2}\right\rfloor\right)\mathrm{mod}X,$$
$$\left(n+2-\left\lfloor\frac{m}{2}\right\rfloor\right)\mathrm{mod}X,\ \ldots\ ,\text{ and }\left(n+m-1-\left\lfloor\frac{m}{2}\right\rfloor\right)\mathrm{mod}X.$$

As a third alternative, the one or more RSs may be those of the configured RSs that are QCLed with the SSBs with indices $$\left(n-\left\lceil\frac{m}{2}\right\rceil\right)\mathrm{mod}X,\ \left(n+1-\left\lceil\frac{m}{2}\right\rceil\right)\mathrm{mod}X,$$
$$\left(n+2-\left\lceil\frac{m}{2}\right\rceil\right)\mathrm{mod}X,\ \ldots\ ,\text{ and }\left(n+m-1-\left\lceil\frac{m}{2}\right\rceil\right)\mathrm{mod}X.$$

In the above formulas, m is the number of the one or more RSs of the subset. In other words, m is the number of the RSs for which the availability indication indicates an availability state. In particular, m may be the bit field size of the availability indication.

Furthermore, in the above formulas, n is the index of the SSB QCLed with the signalling. In other words, the received signalling is QCLed with the SSB of index #n, e.g., the QCL reference of the L1 indication occasion is #n.

Moreover, in the above formulas, X is the total number of SSB indices, as already explained above.

Indicating the availability state of those RSs that are QCLed with the SSBs having an index according to one of the above formulas may achieve a good compromise between overhead and flexibility while taking UE IDLE/INACTIVE mode mobility into account. Furthermore, it may allow to appropriately decide the indicated RSs (i.e. their QCL indices) even when the adjacent index does not correspond to the adjacent physical beam.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Furthermore, the various embodiments may also be implemented by means of software modules, which are executed by a processor or directly in hardware. Also a combination of software modules and a hardware implementation may be possible. The software modules may be stored on any kind of computer-readable storage media. In particular, according to another implementation, a non-transitory computer-readable recording medium is provided. The recording medium stores a program which, when executed by one or more processors, causes the one or more processors to carry out the steps of a method according to the present disclosure.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

It should be further noted that the individual features of the different embodiments may individually or in arbitrary combination be subject matter to another embodiment. It would be appreciated by a person skilled in the art that numerous variations and/or modifications may be made to the present disclosure as shown in the specific embodiments. The present embodiments are, therefore, to be considered in all respects to be illustrative and not restrictive.

Further Aspects

According to a first aspect, a user equipment (UE) is provided. The UE comprises a transceiver which, in operation, receives a signalling. Furthermore, the UE comprises circuitry which, in operation: (i) obtains from the signalling an availability indication, and (ii) determines, out of a plurality of configured RSs, one or more RSs, for which the availability indication indicates an availability state. The circuitry determines the one or more RSs based on at least one of: (i) a number of the plurality of configured RSs, (ii) a subset configuration received via RRC, or from a SIB, (iii) a QCL reference of the signalling, and (iv) a timing occasion where the signalling is transmitted.

According to a second aspect, provided in addition to the first aspect, the circuitry, in operation, determines (i) when the number of the configured RSs is smaller than or equal to a threshold value, that the availability indication indicates, for each of the configured RSs, an availability state of the RS; and (ii) when the number of configured RSs is larger than the threshold value, that the availability indication indicates, for a number of the one or more RSs that is smaller than the number of the configured RSs, an availability state of the RS.

According to a third aspect, provided in addition to the first or second aspect, the subset configuration includes: (i) an indication indicating a number of the one or more RSs; and/or (ii) an indication indicating the one or more RSs.

According to a fourth aspect, provided in addition to one of the first to third aspect, the transceiver, in operation, receives a plurality of subset configurations for a plurality of QCL references, respectively, wherein each of the subset configurations indicates a respective subset of the configured RSs, and the plurality of QCL references includes the QCL reference of the signalling. Furthermore, the circuitry, in operation, determines that the one or more RSs are the RSs of the subset indicated by the subset configuration for the QCL reference of the signalling.

According to a fifth aspect, provided in addition to one of the first to third aspect, the QCL reference of the signalling corresponds to a SSB index of a SSB with which the signalling is QCLed, each RS of the configured RSs is QCLed with a respective SSB. Furthermore, the circuitry, in operation, determines the one or more RSs based on: (i) the SSB index QCLed with the signalling, and (ii) SSB indices with which the configured RSs are QCLed.

According to a sixth, provided in addition to fifth aspect, the circuitry, in operation, determines the one or more, based on a number m of the one or more RSs, to be those m of the configured RSs for which an absolute value of a difference between the SSB index of the SSB QCLed with said RS and the index of the signalling is the smallest among the configured RSs According to a seventh aspect, provided in addition to the sixth aspect, the number of configured RSs is smaller than (i) a total number of SSB indices, or (ii) a number of beams.

According to an eights aspect, provided in addition to the fifth aspect, the circuitry, in operation, determines that the one or more RSs are those of the configured RSs that are QCLed with an SSB with SSB index $$n, (n+1) \bmod X, (n+2) \bmod X, \ldots, \text{ or } (n+m-1) \bmod X,$$

wherein m is a number of the one or more RSs, n is the index of the SSB QCLed with the signalling, and X is a total number of SSB indices.

According to an ninth aspect, provided in addition to the fifth aspect, the circuitry, in operation, determines that the one or more RSs are those of the configured RSs that are QCLed with an SSB with SSB index $$\left(n-\left\lfloor\frac{m}{2}\right\rfloor\right)\bmod X,\ \left(n+1-\left\lfloor\frac{m}{2}\right\rfloor\right)\bmod X,\ \left(n+2-\left\lfloor\frac{m}{2}\right\rfloor\right)\bmod X,\ \ldots,\ \left(n+m-1-\left\lfloor\frac{m}{2}\right\rfloor\right)\bmod X,$$

wherein m is a number of the one or more RSs, n is the index of the SSB QCLed with the signalling, and X is a total number of SSB indices.

According to a tenth aspect, provided in addition to the fifth aspect, the circuitry, in operation, determines that the one or more RSs are those of the configured RSs that are QCLed with an SSB with SSB index $$\left(n-\left\lceil\frac{m}{2}\right\rceil\right)\bmod X,\ \left(n+1-\left\lceil\frac{m}{2}\right\rceil\right)\bmod X,\ \left(n+2-\left\lceil\frac{m}{2}\right\rceil\right)\bmod X,\ \ldots,\ \left(n+m-1-\left\lceil\frac{m}{2}\right\rceil\right)\bmod X,$$

wherein m is a number of the one or more RSs, n is the index of the SSB QCLed with the signalling, and X is a total number of SSB indices.

According to an eleventh aspect, a method for a user equipment (UE) is provided. The method includes the steps of (i) receiving a signalling; (ii) obtaining, from the signalling, an availability indication; and (iii) determining, out of a plurality of RSs, one or more RSs, for which the availability indication indicates an availability state. The the one or more RSs are determined based on at least one of: (i) a number of the plurality of configured RSs, (ii) a subset configuration received via RRC or from a SIB; (iii) a QCL reference of the signalling; and (iv) a timing occasion where the signalling is transmitted.

According to a twelfth aspect, a scheduling device is provided. The scheduling device comprises circuitry which, in operation, (i) determines that a signalling that includes an availability indication is to be generated; (ii) determines, out of a plurality of configured RSs, one or more RSs, for which the availability indication is to indicate an availability state; and (iii) generates the signalling. The circuitry determines the one or more RSs based on at least one of: (i) a number of the plurality of configured RSs; (ii) a subset configuration received via RRC or from a SIB; (iii) a QCL reference of the signalling; and (iv) a timing occasion where the signalling is transmitted. Furthermore, the scheduling device comprises a transceiver which, in operation, transmits the signalling.

According to a thirteenth aspect, a method for a scheduling device is provided. The method includes the steps of: (i) determining that a signalling that includes an availability indication is to be generated; (ii) determining, out of a plurality of configured RSs, one or more RSs, for which the availability indication is to indicate an availability state; (iii) generating the signalling; and (iv) transmitting the signalling. The one or more RSs are determined based on at least one of: (i) a number of the plurality of configured RSs; (ii) a subset configuration received via RRC or from a SIB; (iii) a QCL reference of the signalling; and (iv) a timing occasion where the signalling is transmitted;

Summarizing, provided are a communication device, a network node, and corresponding methods for a communication device and a network node. The communication device comprises a transceiver, which in operation, receives a signalling. The communication device further comprises circuitry, which, in operation, (i) obtains from the signalling an availability indication, and (ii) determines, out of a plurality of configured reference signals (RSs), one or more RSs, for which the availability indication indicates an availability state. The circuitry determines the one or more RSs based on at least one of (i) a number of the plurality of configured RSs, (ii) a subset configuration received via radio resource control, RRC, or from a system information Block (SIB), (iii) a quasi co-location (QCL) reference of the signalling, and (iv) a timing occasion where the signalling is transmitted.

The invention claimed is:

1. A user equipment (UE), comprising:

a transceiver which, in operation, receives a signalling; and circuitry which, in operation:

obtains from the signalling an availability indication, and determines, out of a plurality of configured reference signals (RSs), one or more RSs, for which the availability indication indicates an availability state, wherein each RS of the configured RSs is quasi co-located (QCLed) with a respective synchronization symbol block (SSB), and the circuitry determines the one or more RSs based on:

(i) at least one of:

a number of the plurality of configured RSs, a subset configuration received via radio resource control (RRC) or from a system information block (SIB), a quasi co-location (QCL) reference of the signalling corresponding to a SSB index of the SSB with which the signalling is QCLed, or a timing occasion where the signalling is transmitted;

(ii) the SSB index QCLed with the signalling, and SSB indices with which the configured RSs are QCLed; and (iii) a number m of the one or more RSs, wherein, for those m configured RSs, an absolute value of a difference between:

the SSB index of the SSB QCLed with said RS, and an index of the signalling is the smallest among the plurality of configured RSs.

2. The UE according to claim 1, wherein the circuitry, in operation, determines:

when the number of the plurality of configured RSs is smaller than or equal to a threshold value, that the availability indication indicates, for each of the configured RSs, an availability state of the RS; and when the number of the plurality of configured RSs is larger than the threshold value, that the availability indication indicates, for the number m of the one or more RSs that is smaller than the number of the plurality of configured RSs, an availability state of the RS.

3. The UE according to claim 1, wherein the subset configuration includes:

an indication indicating the number m of the one or more RSs; and/or an indication indicating the one or more RSs.

4. The UE according to claim 1, wherein the transceiver, in operation, receives a plurality of subset configurations for a plurality of QCL references, respectively, wherein each of the subset configurations indicates a respective subset of the configured RSs, and the plurality of QCL references includes the QCL reference of the signalling; and the circuitry, in operation, determines that the one or more RSs are the RSs of the subset indicated by the subset configuration for the QCL reference of the signalling.

5. The UE according to claim 1, wherein the number of the plurality of configured RSs is smaller than:

a total number of SSB indices, or a number of beams.

6. The UE according to claim 1, wherein the circuitry, in operation, determines that the one or more RSs are those of the configured RSs that are QCLed with an SSB with SSB index n, (n+1) mod X, (n+2) mod X, . . . , and (n+m−1) mod X, wherein m is the number of the one or more RSs, n is the index of the SSB QCLed with the signalling, and X is a total number of SSB indices.

7. The UE according to claim 1, wherein the circuitry, in operation, determines that the one or more RSs are those of the configured RSs that are QCLed with an SSB with SSB index $$\left(n-\left\lfloor\frac{m}{2}\right\rfloor\right)\text{mod}X,\ \left(n+1-\left\lfloor\frac{m}{2}\right\rfloor\right)\text{mod}X,$$
$$\left(n+2-\left\lfloor\frac{m}{2}\right\rfloor\right)\text{mod}X,\ \ldots\ ,\text{ and }\left(n+m-1-\left\lfloor\frac{m}{2}\right\rfloor\right)$$

mod X, wherein m is the number of the one or more RSs, n is the index of the SSB QCLed with the signalling, and X is a total number of SSB indices.

8. The UE according to claim 1, wherein the circuitry, in operation, determines that the one or more RSs are those of the configured RSs that are QCLed with an SSB with SSB index $$\left(n-\left\lceil\frac{m}{2}\right\rceil\right)\text{mod}X,\ \left(n+1-\left\lceil\frac{m}{2}\right\rceil\right)\text{mod}X,$$
$$\left(n+2-\left\lceil\frac{m}{2}\right\rceil\right)\text{mod}X,\ \ldots\ ,\text{ and }\left(n+m-1-\left\lceil\frac{m}{2}\right\rceil\right)$$

mod X, wherein m is the number of the one or more RSs, n is the index of the SSB QCLed with the signalling, and X is a total number of SSB indices.

9. A method for a user equipment (UE), the method including the steps of:

receiving a signalling;

obtaining, from the signalling, an availability indication; and determining, out of a plurality of configured reference signals (RSS), one or more RSs, for which the availability indication indicates an availability state, wherein each RS of the configured RSs is quasi co-located (QCLed) with a respective synchronization symbol block (SSB), wherein the one or more RSs are determined based on:

(i) at least one of:

a number of the plurality of configured RSs, a subset configuration received via radio resource control (RRC) or from a system information block (SIB), a quasi co-location (QCL) reference of the signalling corresponding to a SSB index of the SSB with which the signalling is QCLed, or a timing occasion where the signalling is transmitted;

(ii) the SSB index QCLed with the signalling, and SSB indices with which the configured RSs are QCLed; and (iii) a number m of the one or more RSs, wherein, for those m configured RSs, an absolute value of a difference between:

the SSB index of the SSB QCLed with said RS, and an index of the signalling is the smallest among the plurality of configured RSs.

10. A scheduling device comprising:

circuitry which, in operation, determines that a signalling that includes an availability indication is to be generated;

determines, out of a plurality of configured reference signals, (RSs), one or more RSs, for which the availability indication is to indicate an availability state, wherein each RS of the configured RSs is quasi co-located (QCLed) with a respective synchronization symbol block (SSB); and generates the signalling, wherein the circuitry determines the one or more RSs based on:

(i) at least one of:

a number of the plurality of configured RSs, a subset configuration received via radio resource control; (RRC), or from a system information block (SIB), a quasi co-location, (QCL), reference of the signalling corresponding to a SSB index of the SSB with which the signalling is QCLed, or a timing occasion where the signalling is transmitted;

(ii) the SSB index QCLed with the signalling, and SSB indices with which the configured RSs are QCLed; and (iii) a number m of the one or more RSs, wherein, for those m configured RSs, an absolute value of a difference between:
the SSB index of the SSB QCLed with said RS, and an index of the signalling
is the smallest among the plurality of configured RSs; and
a transceiver which, in operation, transmits the signalling.

* * * * *